United States Patent
Mastrocola et al.

(10) Patent No.: US 11,708,795 B1
(45) Date of Patent: Jul. 25, 2023

(54) SYSTEMS AND METHODS FOR BLEED VALVE CONTROL IN FUEL SYSTEMS

(71) Applicant: Hamilton Sundstrand Corporation, Charlotte, NC (US)

(72) Inventors: Naison E. Mastrocola, Goshen, CT (US); Ryan Prescott Susca, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/857,996

(22) Filed: Jul. 5, 2022

(51) Int. Cl.
  *F02C 9/26* (2006.01)
  *F02C 9/28* (2006.01)
  *F02C 9/46* (2006.01)
  *F02C 7/236* (2006.01)

(52) U.S. Cl.
  CPC .............. *F02C 9/263* (2013.01); *F02C 7/236* (2013.01); *F02C 9/28* (2013.01); *F02C 9/46* (2013.01); *F05D 2270/112* (2013.01); *F05D 2270/303* (2013.01); *F05D 2270/304* (2013.01)

(58) Field of Classification Search
  CPC .... F02C 9/26; F02C 9/263; F02C 9/28; F02C 9/44; F02C 9/46; F02C 7/232; F02C 7/236
  See application file for complete search history.

(56) References Cited

U.S. PATENT DOCUMENTS

| | | | | |
|---|---|---|---|---|
| 6,810,674 | B2* | 11/2004 | Clements | F04C 14/226 60/773 |
| 8,857,150 | B2* | 10/2014 | Aurousseau | F02C 9/28 60/803 |
| 9,388,778 | B2* | 7/2016 | Baker | F02M 37/0052 |
| 9,885,287 | B2* | 2/2018 | Striker | F02C 7/224 |
| 10,428,744 | B2* | 10/2019 | Veilleux | F02C 9/28 |
| 10,502,145 | B2 | 12/2019 | DeRoy et al. | |
| 10,890,117 | B2* | 1/2021 | Chalaud | F02C 9/46 |
| 11,199,133 | B2 | 12/2021 | Cocks | |
| 11,396,848 | B2* | 7/2022 | Brady | F02C 9/28 |
| 2004/0011052 | A1* | 1/2004 | Clements | F02C 9/263 60/773 |
| 2004/0117102 | A1* | 6/2004 | Weir | F02C 9/263 701/1 |
| 2007/0044768 | A1* | 3/2007 | Eick | F02C 7/236 123/478 |
| 2010/0257867 | A1* | 10/2010 | Aurousseau | F02C 9/263 73/112.01 |
| 2015/0020884 | A1* | 1/2015 | Baker | F02C 9/263 137/565.11 |
| 2016/0076452 | A1* | 3/2016 | Striker | F02C 7/224 60/734 |

(Continued)

*Primary Examiner* — Alain Chau
(74) *Attorney, Agent, or Firm* — Locke Lord LLP; Scott D. Wofsy; Alicia J. Carroll

(57) ABSTRACT

A fuel system includes a fuel metering unit having a fuel inlet and a fuel outlet defining a flow path therebetween. The fuel system includes a bleed valve in fluid communication with the flow path of the fuel metering unit. The fuel system includes a controller in communication with the fuel metering unit and the bleed valve to send data thereto and/or receive data therefrom. The bleed valve is configured and adapted to open or close depending on a command from the controller. The flow path is configured and adapted to be in selective fluid communication with a fuel system interstage through the bleed valve.

17 Claims, 3 Drawing Sheets

(56) References Cited

U.S. PATENT DOCUMENTS

| | | | |
|---|---|---|---|
| 2018/0045122 A1* | 2/2018 | Veilleux | F01D 21/003 |
| 2018/0372006 A1* | 12/2018 | Chalaud | F02C 9/38 |
| 2020/0191057 A1* | 6/2020 | Cocks | B64D 15/02 |
| 2020/0355119 A1* | 11/2020 | Ribarov | F02C 7/232 |
| 2021/0010429 A1* | 1/2021 | Brady | F02C 9/263 |
| 2022/0195925 A1* | 6/2022 | Rambo | F02C 7/232 |

* cited by examiner

SYSTEMS AND METHODS FOR BLEED VALVE CONTROL IN FUEL SYSTEMS

BACKGROUND OF THE INVENTION

1. Field of the Invention

The present disclosure relates to fuel systems, and more particularly to fuel systems for aircraft jet turbine engines.

2. Description of Related Art

An effective Thermal Management Systems (TMS) for an aircraft jet turbine is dependent on a high degree of integration and interdependency among many systems. These systems often behave symbiotically whereas one system is made less efficient to benefit another (parasitism) or one system's inherent inefficiency benefits the other at no further cost (mutualism). The former is a detriment to overall aircraft efficiency and is often the focus of architecture advancement for future programs.

Fuel system designs can utilize positive displacement pumps which are sized for low N2 start. N2 is a term used for the rotational speed of the high pressure spool of turbine engines expressed as a percentage of the maximum normal operating RPM. This generally results in waste heat created at higher N2. This waste heat created by the fuel system is rejected to other points on the engine for thermal management, such as oil heating or fuel ice melting. The most efficient pumping system creates only the needed pressure/flow for all N2 speeds and is the ultimate goal for fuel system design. When this goal is attained, waste heat is reduced and alternate means of performing legacy heating tasks through a TMS are needed.

The conventional techniques have been considered satisfactory for their intended purpose. However, there is an ever present need for improved fuel system bleed valves. This disclosure provides a solution for this need.

SUMMARY OF THE INVENTION

A fuel system includes a fuel metering unit having a fuel inlet and a fuel outlet defining a flow path therebetween. The fuel system includes a bleed valve in fluid communication with the flow path of the fuel metering unit. The fuel system includes a controller in communication with the fuel metering unit and the bleed valve to send data thereto and/or receive data therefrom. The bleed valve is configured and adapted to open or close depending on a command from the controller. The flow path is configured and adapted to be in selective fluid communication with a fuel system interstage through the bleed valve.

In some embodiments, the fuel outlet can be in fluid communication with an engine. The fuel metering unit can include a first main stage pump and a second main stage pump upstream from the engine. The bleed valve can be downstream from the first and second main stage pumps. The fuel metering unit can include a fuel metering valve between the first and second main stage pumps and the engine. The bleed valve can be positioned between the first and second main stage pumps and the engine. The fuel metering unit can include a temperature sensor positioned between the bleed valve and the engine.

In some embodiments, the controller is in communication with an N2 sensor to receive an input from the N2 sensor and determine whether a speed of the engine is at or above an idle state or below the idle state. The controller can be in communication with the bleed valve to send a shut-off command to the bleed valve when the engine is below the idle state. The controller can be configured and adapted to be in communication with the fuel system interstage to receive a TMS bleed demand input therefrom. The fuel metering unit can include a temperature sensor positioned between the bleed valve and the engine. The controller can be in communication with the temperature sensor to receive a fuel temperature measurement therefrom. The controller can be in communication with the bleed valve to send a turn-on command to the bleed valve when the TMS demand input is positive and when the fuel temperature measurement is greater than a hysteresis band limit. The controller can be in communication with a second main stage pump. The controller is configured and adapted to send a flood command to the second main stage pump when the fuel temperature measurement is less than or equal to a hysteresis band limit.

In accordance with another aspect, a method for controlling a bleed valve in a fuel system includes receiving a data input with a controller from an N2 sensor of an engine. The method includes determining whether a speed of the engine is at or above an idle state or below the idle state based on the data input from the N2 sensor. The method includes switching the bleed valve on or off depending on whether the speed of the engine is below the idle state OR at or above the idle state.

The method can include receiving a positive TMS demand input with the controller, measuring a fuel temperature with a temperature sensor and receiving a fuel temperature measurement in the controller, and, if the fuel temperature measurement is greater than a hysteresis band limit, switching the bleed valve on. The method can include receiving a positive TMS demand input with the controller, measuring a fuel temperature with a temperature sensor and receiving a fuel temperature measurement in the controller, and, if the fuel temperature measurement is less than or equal to a hysteresis band limit, flooding a second stage pump of the fuel system. The method can include switching the bleed valve on after flooding the second stage pump.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
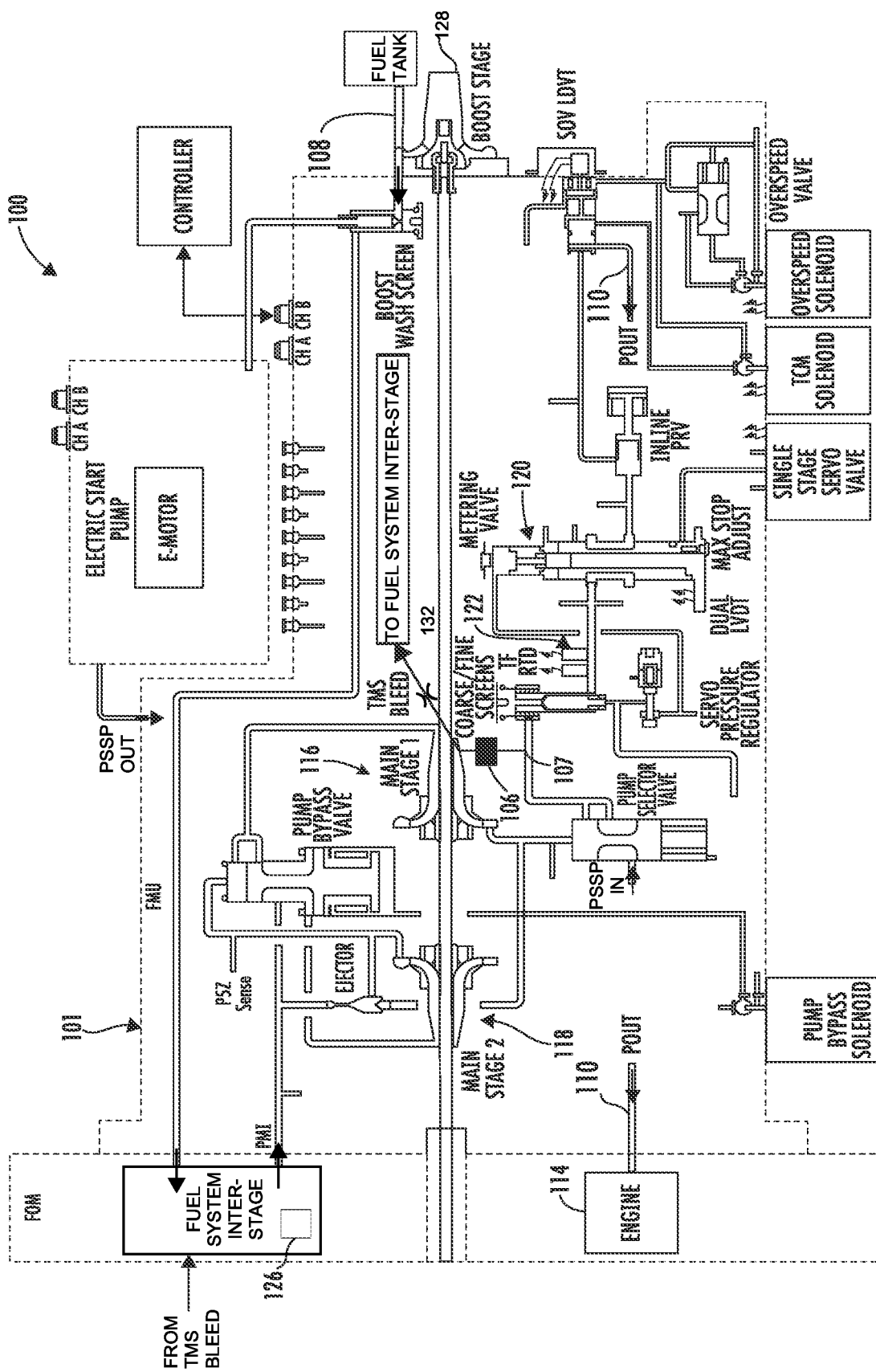
FIG. 1 is a schematic depiction of a fuel system constructed in accordance with an embodiment of the present disclosure, showing the fuel metering unit and TMS bleed valve.

Reference will now be made to the drawings wherein like reference numerals identify similar structural features or aspects of the subject disclosure. For purposes of explanation and illustration, and not limitation, a schematic view of an exemplary embodiment of the fuel system in accordance with the disclosure is shown in FIG. 1 and is designated generally by reference character 100. Other embodiments of the fuel system in accordance with the disclosure, or aspects thereof, are provided in FIGS. 2-3 as will be described. The systems and methods described herein can be used to allow fuel systems to become more efficient, e.g. by implementing a two-stage fuel pump design, while also providing the heating needed by other systems, such as a thermal management system (TMS) of a fuel system interstage 102 which typically relies on the fuel pump waste heat. This allows other systems to avoid taking on weight and complexity of other thermal control devices to handle thermal control typically handled by coupling to the fuel system.

Figure 2:
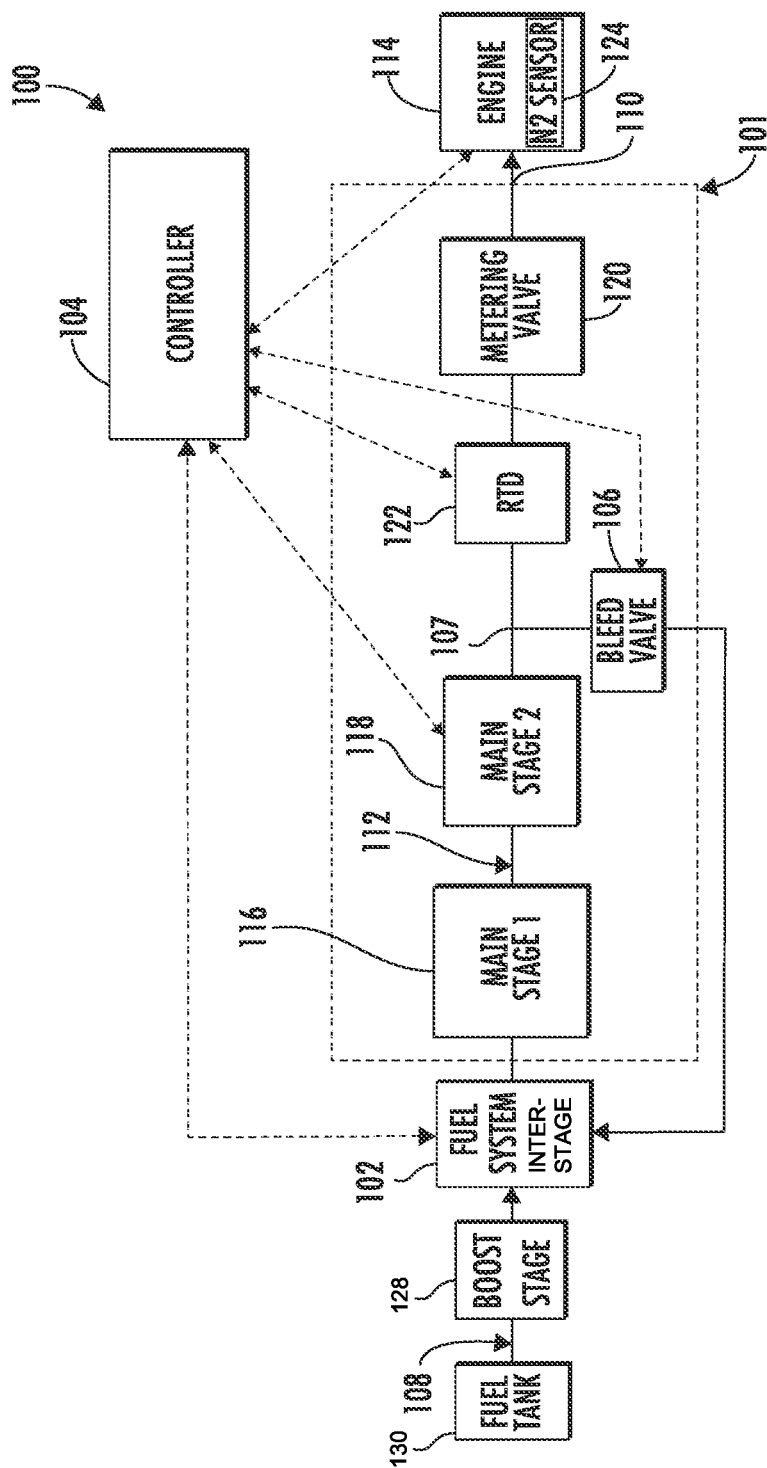
FIG. 2 is a block diagram schematically depicting the fuel system of FIG. 1, showing the connections between the fuel metering unit and the fuel system interstage.

As shown in FIGS. 1-2, a fuel system 100 includes a fuel metering unit (FMU) 101 having a fuel inlet 108 and a fuel outlet 110 with a FMU fuel discharge pressure (POUT). A flow path 112 is defined between the fuel inlet 108 and the fuel outlet 110. The fuel inlet 108 is in fluid communication with a boost stage pump 128 and a fuel tank 130. A boost wash screen is downstream from boost stage pump 128 and splits flow between flow path 112 and an electric start pump. Flow path 112 is configured and adapted to be in selective fluid communication with a TMS of a fuel system interstage 102. The fuel system interstage 102 is within the fuel oil manifold (FOM), which is the interface between the fuel system 100 and a gear box. Fuel system 100 includes a TMS bleed valve 106 in fluid communication with the flow path 112 at a TMS bleed port 107. A flow regulating orifice 132 is downstream from valve 106. In the fuel system interstage 102, the fuel enters a number of heat exchangers (fuel-oil, generator heat exchangers, etc) and the main fuel filter before returning to the fuel control and entering the main pump stage. The purpose of the TMS bleed valve 106 and port 107 is to increase the fuel flow through the interstage 102 when engine 114 is at low burn flow. For example, engine 114 may be at a ground-idle condition with 600 pph of fuel low, but the oil in the fuel oil control unit of the interstage 102 needs fuel flow rates of 1800-2500 pph to prevent overheating the engine oil. So the TMS bleed port 107 is opened to return the delta fuel required (above burn flow) to interstage 102, in order to satisfy the heat exchangers of the TMS of the interstage 102.

Conversely, there are conditions where the fuel can be too cold and there are concerns of ice build-up in the fuel system (during descent conditions after hours of cruising at altitude). In this situation, the delta temperature between the oil and the fuel is too high and the fuel-oil heat exchangers are not able to adequately transfer enough heat to raise fuel above freezing temperatures, so the TMS bleed valve 106 is opened to increase fuel flow through the heat exchangers of the TMS of the interstage 102, using a combination of heat from the heat exchangers and the additional waste heat from a second main stage pump 118 to increase the fuel temperature. The fuel system 100 includes a controller 104 in communication with the interstage 102, one or more elements in the fuel metering unit 101 and TMS bleed valve 106 to send data thereto and/or receive data therefrom. Bleed valve 106 controls flow through TMS bleed port 107 taken after a pump selector valve 109. Bleed valve 106 is configured and adapted to selectively open or close depending on a command from controller 104. Controller 104 can be the Full Authority Digital Engine Control (FADEC). Controller 104 is configured and adapted to be in communication with fuel system interstage 102.

With continued reference to FIGS. 1-2, fuel outlet 110 is in fluid communication with an engine 114, such as a turbine engine. The fuel metering unit 101 includes a first main stage pump 116 and a second main stage pump 118 upstream from engine 114. TMS bleed port 107 and TMS bleed valve 106 are downstream from the first and second main stage pumps 116 and 118, respectively. TMS bleed port 107 is downstream from a pump selector valve, which switches between an electric start pump (at start pump discharge pressure PSSP) and or more of the main stage pumps 116 and 118. The fuel metering unit 101 includes a fuel metering valve 120 between the first and second main stage pumps 116 and 118, respectively, and engine 114. TMS bleed port 107 and bleed valve 106 are positioned between the first and second main stage pumps 116 and 118, respectively, and engine 114. TMS bleed port 107 and bleed valve 106 are upstream from fuel metering valve 120. An inline pressure regulating valve (PRV) is downstream from the metering valve 120 and upstream from the fuel outlet 110.

As shown in FIGS. 1-2, fuel metering unit 101 includes a fuel temperature sensor 122, e.g. a resistive thermal device (RTD) 122, positioned between bleed valve 106 and engine 114. Those skilled in the art will readily appreciate that the temperature sensor can be a RTD, or a variety of other suitable temperature sensors. Engine 114 includes an N2 sensor 124 to sense the rotational speed of the high pressure turbine of the engine 114. Controller 104 is in communication with N2 sensor 124 to receive an input from N2 sensor 124 and determine whether a speed of engine 114 is in an idle state or above, or below an idle state. If engine 114 is at a speed below idle state, controller 104 is in communication with bleed valve 106 to send a shut-off command to bleed valve 106. Controller 104 is in communication with interstage 102 (fuel-oil, generator heat exchangers, oil temperature sensors, etc).

Figure 3:
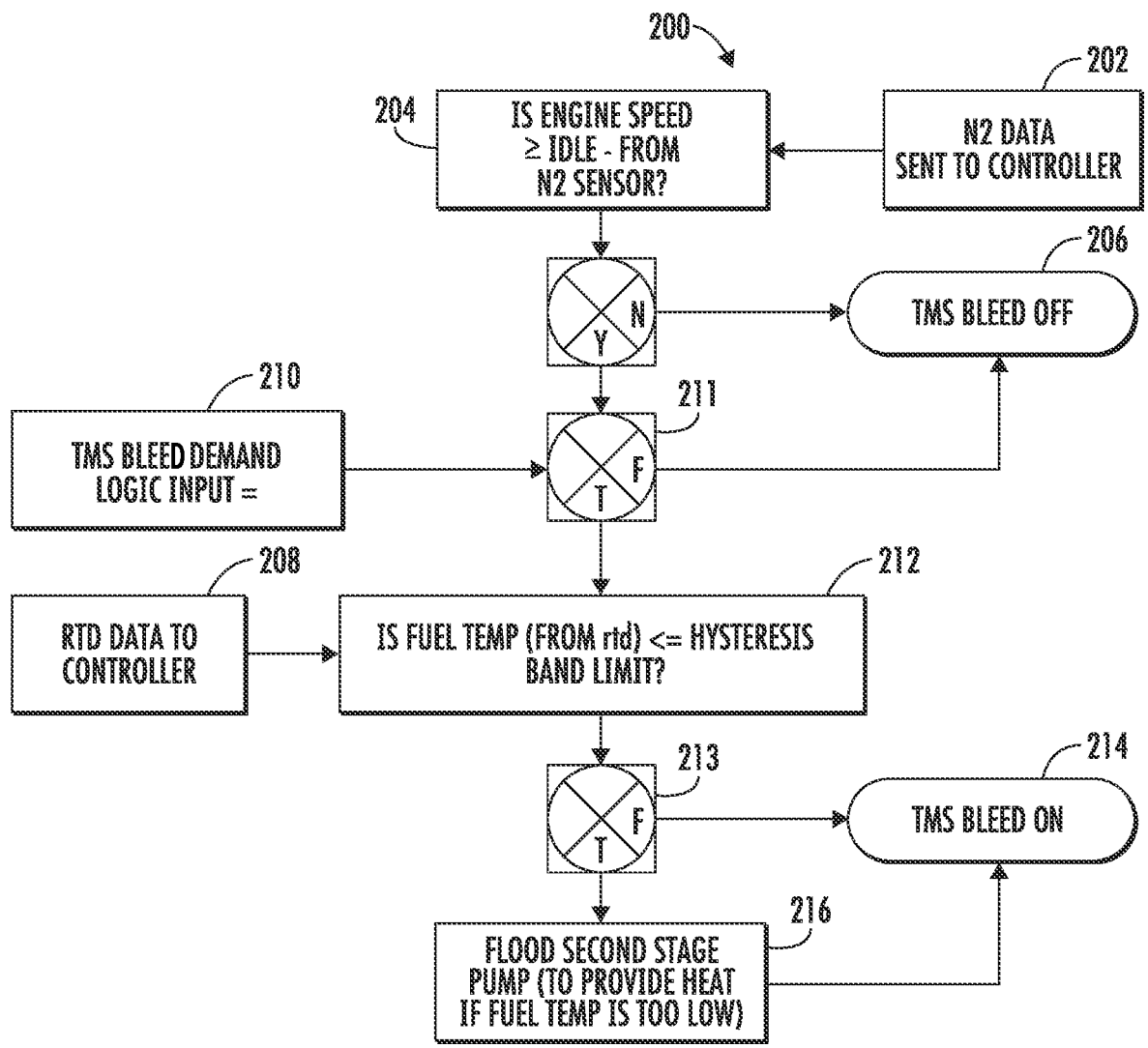
FIG. 3 is a flow chart schematically depicting a method for controlling a bleed valve in a fuel system in accordance with an embodiment of the present disclosure.

With continued reference to FIGS. 1-3, controller 104 is in communication with fuel system interstage 102 to receive a TMS bleed demand input therefrom. If the speed of engine 114 is at or above idle state, controller 104 receives a TMS bleed demand input. If the TMS bleed demand input is negative (F), controller 104 sends shut-off command to bleed valve 106. If the TMS bleed demand input is positive (T), controller 104 is in communication with RTD 122 to receive a fuel temperature measurement therefrom. In accordance with the embodiment shown in FIG. 3, the TMS bleed demand input is positive (T) if the difference in temperature between the fuel downstream from second main stage pump 118 and engine oil running through fuel system interstage 102 is greater than a oil-fuel temperature delta threshold, or if the fuel or oil temps are above or below a normal operating band. Those skilled in the art will readily appreciate that the oil temperature in the interstage can be measured using at least one oil temperature sensor 126.

With continued reference to FIGS. 1-3, controller 104 is in communication with bleed valve 106 to send an "on" command to bleed valve 106 when the TMS demand input is positive and when the fuel temperature measurement is greater than a hysteresis band limit. Controller 104 is in communication with second main stage pump 118. Controller 104 is configured and adapted to send a flood command to second main stage pump 118 when the TMS demand input is positive and the fuel temperature measurement is less than or equal to a hysteresis band limit. This flood command to second main stage pump 118 allows for the bleed valve 106 fluid flow to meet the TMS demand input in a two-stage centrifugal main fuel pump, where the second main stage pump 118 may not be running. While there are inefficiencies associated with flooding the second main stage pump 118, there is a benefit to providing the needed fluid flow to the fuel system interstage 102.

As shown in FIG. 3, a method 200 for controlling a bleed valve, e.g. bleed valve 106, in a fuel system, e.g. fuel system 100, includes receiving a data input with a controller, e.g. controller 104, from an N2 sensor, e.g. N2 sensor 124, of a turbine engine, e.g. engine 114, as shown schematically by box 202. The method includes determining whether a speed of the engine is at or above an idle state or below the idle state based on the data input from the N2 sensor, as shown schematically by box 204. The method includes switching a bleed valve, e.g. bleed valve 106, ON or OFF depending on whether the speed of the engine is below the idle state OR at or above the idle state. If the speed of the engine is below the idle state, the method includes switching the bleed valve OFF, as shown schematically by box 206.

With continued reference to FIG. 3, if the speed of the engine is at or above the idle state, the method includes determining if the TMS demand (T) is positive or negative (F), as schematically shown by boxes 210, 211. If negative, the method includes switching the bleed valve OFF, as shown schematically by box 206. If TMS demand is positive, the method includes measuring a fuel temperature with a temperature sensor, e.g. RTD 122, and receiving a fuel temperature measurement in the controller, as shown schematically by box 208.

With continued reference to FIG. 3, if the TMS demand is positive, and the fuel temperature measurement is greater than a hysteresis band limit (F), as shown schematically by boxes 212 and 213, the method includes switching the bleed valve ON, as shown schematically by box 214. Those skilled in the art will readily appreciate that the TMS demand input can come from application code hosted in the FADEC, in the aircraft common computing resource, or in the TMS controller. If the TMS demand is positive and the fuel temperature measurement is less than or equal to the hysteresis band limit (T), as shown by boxes 212 and 213, the method includes flooding a second stage pump of fuel system, as shown schematically by box 216, and then the method includes switching the bleed valve ON, as shown schematically by box 214.

The methods and systems of the present disclosure, as described above and shown in the drawings, provide for fuel systems with superior properties including allowing fuel systems to become more efficient, e.g. by implementing a two-stage fuel pump design, while also providing the heating needed by other systems, such as a thermal management system which typically rely on the fuel pump waste heat. The systems and methods of the present invention can apply to gas turbine engines in aircraft, power generation, or the like. While the apparatus and methods of the subject disclosure have been shown and described with reference to preferred embodiments, those skilled in the art will readily appreciate that changes and/or modifications may be made thereto without departing from the scope of the subject disclosure.

As will be appreciated by those skilled in the art, aspects of the present embodiments may be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module," "component" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in a flowchart and/or block diagram block or blocks.

What is claimed is:

1. A fuel system comprising:
a fuel metering unit including a fuel inlet and a fuel outlet defining a flow path therebetween, wherein the fuel outlet is in fluid communication with an engine;
a bleed valve in fluid communication with the flow path of the fuel metering unit, wherein the fuel metering unit includes a temperature sensor positioned between the bleed valve and the engine; and
a controller in communication with the fuel metering unit and the bleed valve to send data thereto and/or receive data therefrom, wherein the controller is in communication with the temperature sensor to receive a fuel temperature measurement therefrom, wherein the bleed valve is configured and adapted to open or close depending on a command from the controller, wherein the flow path is configured and adapted to be in selective fluid communication with a fuel system interstage through the bleed valve, wherein the controller is configured and adapted to be in communication with the fuel system interstage to receive a thermal management system (TMS) bleed demand input therefrom, wherein the controller is in communication with the bleed valve to send a turn-on command to the bleed valve when the TMS bleed demand input is positive and when the fuel temperature measurement is outside of a hysteresis band limit.

2. The system as recited in claim 1, wherein the fuel metering unit includes a first main stage pump and a second main stage pump upstream from the engine.

3. The system as recited in claim 2, wherein the bleed valve is downstream from the first and second main stage pumps.

4. The system as recited in claim 2, wherein the fuel metering unit includes a fuel metering valve between the first and second main stage pumps and the engine.

5. The system as recited in claim 2, wherein the bleed valve is positioned between the first and second main stage pumps and the engine.

6. The system as recited in claim 1, wherein the controller is in communication with a speed (N2) sensor to receive an input from the N2 sensor and determine whether a speed of the engine is in an idle state or above, or a below the idle state.

7. The system as recited in claim 6, wherein the controller is in communication with the bleed valve to send a shut-off command to the bleed valve when the engine is below the idle state.

8. A fuel system comprising:
a fuel metering unit including a fuel inlet and a fuel outlet defining a flow path therebetween, wherein the fuel outlet is in fluid communication with an engine;
a bleed valve in fluid communication with the flow path of the fuel metering unit, wherein the fuel metering unit includes a temperature sensor positioned between the bleed valve and the engine; and
a controller in communication with the fuel metering unit and the bleed valve to send data thereto and/or receive data therefrom, wherein the controller is in communication with the temperature sensor to receive a fuel temperature measurement therefrom, wherein the bleed valve is configured and adapted to open or close depending on a command from the controller, wherein the flow path is configured and adapted to be in selective fluid communication with a fuel system interstage through the bleed valve, wherein the controller is configured and adapted to be in communication with the fuel system interstage to receive a TMS bleed demand input therefrom, wherein the controller is in communication with a second main stage pump, wherein the controller is configured and adapted to send a flood command when the fuel temperature measurement is within of a hysteresis band limit.

9. The system as recited in claim 8, wherein the controller is in communication with the bleed valve to send a turn-on command to the bleed valve when the TMS bleed demand input is positive and when the fuel temperature measurement is outside of a hysteresis band limit.

10. The system as recited in claim 8, wherein the fuel metering unit includes a first main stage pump and a second main stage pump upstream from the engine.

11. The system as recited in claim 8, wherein the bleed valve is downstream from the first and second main stage pumps.

12. The system as recited in claim 8, wherein the fuel metering unit includes a fuel metering valve between the first and second main stage pumps and the engine.

13. The system as recited in claim 8, wherein the bleed valve is positioned between the first and second main stage pumps and the engine.

14. The system as recited in claim 8, wherein the controller is in communication with a speed (N2) sensor to receive an input from the N2 sensor and determine whether a speed of the engine is in an idle state or above, or a below the idle state.

15. The system as recited in claim 14, wherein the controller is in communication with the bleed valve to send a shut-off command to the bleed valve when the engine is below the idle state.

16. A method for controlling a bleed valve in a fuel system, the method comprising:
receiving a data input with a controller from a speed (N2) sensor of an engine;
determining whether a speed of the engine is at or above an idle state or below the idle state based on the data input from the N2 sensor;
switching the bleed valve on or off depending on whether the speed of the engine is below the idle state OR at or above the idle state;
receiving a positive thermal management system (TMS) demand input with the controller;

measuring a fuel temperature with a temperature sensor and receiving a fuel temperature measurement in the controller; and at least one of: switching the bleed valve on if the fuel temperature measurement is greater than a hysteresis band limit, or flooding a second stage pump of the fuel system if the fuel temperature measurement is less than or equal to the hysteresis band limit.

17. The method as recited in claim 16, wherein, if the fuel temperature measurement is less than or equal to the hysteresis band limit, further comprising switching the bleed valve on after flooding the second stage pump.

\* \* \* \* \*